United States Patent [19]
Allen

[11] Patent Number: 5,414,422
[45] Date of Patent: May 9, 1995

[54] DATA MANIPULATION OPERATION KEYPAD FOR USE WITH A POINTING DEVICE

[75] Inventor: Donald M. Allen, The Woodlands, Tex.

[73] Assignee: Compaq Computer Corporation, Houston, Tex.

[21] Appl. No.: 227,099

[22] Filed: Apr. 13, 1994

Related U.S. Application Data

[63] Continuation of Ser. No. 906,764, Jun. 30, 1992, abandoned.

[51] Int. Cl.⁶ .......................... H03K 17/94; B41J 5/08
[52] U.S. Cl. ...................................... 341/22; 345/168; 400/489
[58] Field of Search .................. 341/22; 345/157, 163, 345/167, 168; 400/489

[56] References Cited

U.S. PATENT DOCUMENTS

| | | | |
|---|---|---|---|
| 2,538,449 | 1/1951 | Freshwater | 248/115 |
| 3,640,497 | 2/1972 | Waki | 248/225 |
| 4,657,216 | 4/1987 | Southgate | 248/187 |
| 4,866,602 | 9/1989 | Hall | 364/200 |
| 4,913,387 | 4/1990 | Tice | 248/918 |
| 4,917,516 | 4/1990 | Retter | 400/489 |
| 4,994,795 | 2/1991 | Mackenzie | 340/711 X |
| 5,008,528 | 4/1991 | Duchon | 250/221 |
| 5,063,376 | 11/1991 | Chang | 340/711 X |
| 5,119,742 | 6/1992 | Simmie | 108/152 |
| 5,121,863 | 6/1992 | Kotitalo et al. | 224/42.45 |
| 5,124,689 | 6/1992 | Franz et al. | 340/711 |
| 5,136,694 | 8/1992 | Belt et al. | 341/22 X |
| 5,198,802 | 3/1993 | Bertram et al. | 340/711 X |
| 5,208,736 | 5/1993 | Crooks et al. | 361/393 |
| 5,281,966 | 1/1994 | Walsh | 341/22 |

FOREIGN PATENT DOCUMENTS

| | | | |
|---|---|---|---|
| 0087224 | 7/1980 | Japan | 341/22 |
| 1496522 | 12/1977 | United Kingdom | 341/22 |

OTHER PUBLICATIONS

"Traveling Companions", *PC World*, vol. 10, No. 2, Feb. 1992, pp. 182-189 (San Francisco, Calif. (11 pages total).

Texas Instrument Advertisement, *PC Magazine*, vol. 11, No. 7, Apr. 14, 1992, p. 157 (New York, N.Y.) (3 pages total).

Photographs A-F, Logitech, Inc., bracket attachments for Trackman © Portable Mouse (6 photos, 1 page).

PC Week, Feb. 24, 1992, vol. 9, No. 8; Front cover page, pp. 88-89 (foldouts) (5 pages total).

PC Week, Apr. 20, 1992, vol. 9, No. 16; Front cover page, pp. 74-75 (foldouts) (6 pages total).

Complete Logitech Trackman © Portable product with packaging and documents including, but no limited to, below AA, BB, CC and DD.

"Logitech Getting Started for Trackman © Portable", © 1991 by Logitech, Inc., Fremont, Calif 94555 (30 pages total, including cover pages).

"Logitech Trackman © Portable", packaging, ©1991 Logitech, Inc., Fremont, Calif. (2 page total-front and back of box).

"LOGITECH TRACKMAN © Portable" (long) clamping device.

"LOGITECH TRACKMAN © Portable" (short) clamping device.

(List continued on next page.)

*Primary Examiner*—John K. Peng
*Assistant Examiner*—Thomas J. Mullen, Jr.
*Attorney, Agent, or Firm*—Pravel, Hewitt, Kimball & Krieger

[57] ABSTRACT

A computer system includes a pointing device and a data manipulation keypad on opposite sides of a keyboard. The data manipulation keypad may be either a stand alone unit or attached to the keyboard. A user operates the pointing device with one hand to designate data on a display, and then presses keys with the other hand on the data manipulation keypad to expediently perform data manipulation operations, such COPY or DELETE, on the designated data. Each of the keys on the data manipulation keypad generates keyboard equivalent signals for different data manipulation operations.

21 Claims, 2 Drawing Sheets

OTHER PUBLICATIONS

Complete Appoint Thumbelina P. C. product with packaging and documents including, but not limited to, below EE, FF, GG, HH and II.

Thumbelina "Keyboard Mounting Kit" instructions (1 sheet).

Thumbelina "Laptop Mounting Kit" instructions (1 sheet).

Thumbelina Guide to Operations, PC and Portable Versions, Version 3.0, © Appoint 1989, 1990, 1991, 1992 (21 pages total including cover page).

Thumbelina PC, The World's Most Versatile Mouse, Appoint packaging (2 pages total–front and back of box) *** Note: "Patents Pending" on p. 2.

Thumberlina PC bracket to hold trackball device.

Complete Microsoft ® BallPoint Mouse product with packaging and documents including, but not limited to, below JJ, KK, LL and MM.

Microsoft ® BallPoint Mouse brochure entitled "Three steps and you're ready to roll", ©1991 Microsoft Corporation (Note "U.S. Pat. No. 4,666,602 and patent pending" on brochure) (1 page total).

Microsoft ® BallPoint Mouse User's Guide, Version 8.20, ©Copyright Microsoft Corporation, 1984–1992 (64 pages total including cover pages).

Microsoft ® BallPoint Mouse clamping deivce (Note: above reference U.S. Pat. No. 4,866,602 marking on front).

Microsoft ® BallPoint Mouse packaging, ©1992 Microsoft Corporation (2 pages total–front and back of box).

Logitech Mouseware User'Guide, Logitech, Inc., pp. 18–21, 1991, Fremont, Calif.

*ProHance ProMouse TM User's Guide,* ©Copyright ProHance Technologies, Inc., 1991, Sunnyvale, Calif., printed Aug., 1991 (8 pages total).

DATA MANIPULATION OPERATION KEYPAD FOR USE WITH A POINTING DEVICE

This is a continuation of application Ser. No. 07/906,764, now abandoned, filed on Jun. 30, 1992.

BACKGROUND OF THE INVENTION

1. Field of the Invention

The invention generally relates to data manipulation devices used with computer systems, and more particularly, to a keyboard extension or stand alone device for entering data manipulation commands while the user has one hand on a pointing device and the other hand on the data manipulation device.

2. Description of the Related Art

Traditionally, keyboards have served as the main user interface for computer systems. In data entry applications, the user enters data by typing on the keyboard, and then editing and correcting the data using a pointing device and various data manipulation functions. Generally, data manipulation includes functions associated with editing, like deleting, moving, or changing the properties of blocks of data, and similar operations.

In most personal computers, a menu of manipulation functions is displayed by striking a particular key. Alternatively, in pointing device oriented programs, data manipulation functions are commonly executed using pull-down menus. In either case, the user picks an option from the displayed menu, causing a function to be executed or a sub-menu to be displayed. In some cases, the user must make his way through several levels of sub-menus to find and execute the desired function.

Although the menu method is intuitive and effective, it is also slow and inhibiting. To execute data manipulation commands from the keyboard, the user must frequently enter multiple key sequences, sometimes requiring both hands. As a result, the user must look away from the display to find the proper keys or remove his hand from the pointing device to enter the key sequence.

To speed up the editing process, many manufacturers and designers have provided keyboard equivalent sequences and menu accelerators. Keyboard equivalent sequences are sets of keys that allow the user to execute data manipulation functions by striking a few keys without using the menus. Often, designers assign keystroke sequences to execute the data manipulation functions according to the IBM Standard Application Architecture Common User Access Advanced Interface Design Guide (SAA/CUA), a set of guidelines and standards for standard functions in computer systems. When the keys of the assigned keystroke sequence is depressed, the computer receives a set of signals that indicate a particular operation to be performed on the designated data block, which the computer executes as if the operation were commanded using the menus. For example, the COPY function may be executed in a SAA/CUA standard system by holding the CTRL key down and then striking the INSERT key. When the second key is depressed, the computer system executes the COPY operation exactly as if the function were initiated using the slower menus, without the need to access the menus.

Similarly, menu accelerators allow the user to display a menu and sub-menus by striking a series of keys on the keyboard. With a menu accelerator key, the menus and sub-menus are opened individually by consecutively striking various keys. For example, in certain programs, depressing the ALT key displays a set of topic headings, depressing the E key opens the EDIT menu which includes the COPY function, and then pressing the C key executes the COPY function. Thus, the COPY function can be executed relatively quickly using the menu accelerator keys by consecutively striking the ALT, E, and C keys on the keyboard.

Although keyboard equivalent sequences and menu accelerators improve the speed of the data manipulation process, the system is still slower than the optimum. Ideally, the user has one hand on the pointing device to designate the data to be manipulated, and uses the other hand to perform the key strokes to execute the desired manipulation function. Unfortunately, the user has been hindered by having to remove his eyes from the display to find the proper keys, or by having to remove his hand from the pointing device to perform the key strokes. Consequently, the user's efficiency decreases as he hunts for the keys and moves his hands back and forth across the keyboard to depress the appropriate keys.

One solution to this problem would be to reassign the keyboard equivalent and menu accelerator keys to keys that are quickly accessible with the user's left hand. Much software, however, has been written in accordance with SAA/CUA conventions, and reassignment of the keyboard equivalent and menu accelerator keys would render these applications partially or completely inoperable.

Another solution would be to combine menu accelerators with pop-up menus that appear on the screen at the cursor location. This solution would reduce the amount of pointing device movement required by the user, and would probably improve user performance and satisfaction. Nonetheless, the user would still have to perform the necessary menu accelerator key strokes with the hand not on the pointing device, or remove his hand from the pointing device to strike the keys for menu accelerator operations.

Another potential solution has been provided by Logitech Inc., which has produced a mouse having three buttons. Like the buttons found on most mice, the first button is used for designating data or marking locations on the display. The other two buttons, on the other hand, may be assigned functions from a list of predetermined options, including some data manipulation functions like CUT, PASTE, and DELETE. By assigning functions to the other two buttons, the user can efficiently designate data blocks and perform certain operations entirely from the mouse. On the other hand, the number of functions is limited because only two programmable buttons are provided. Therefore, the user must frequently return to the conventional, awkward method of entering data manipulation commands on the keyboard for commands that are not available on the mouse buttons. Further, the buttons can be returned to their previous functions only by using the SHIFT key in combination. Although providing more buttons would improve the mouse's versatility, adding buttons would quickly overcrowd the surface of the mouse. A larger mouse would provide space for more buttons, but at the cost of maneuverability and aesthetic acceptability.

In addition, current trends in graphical interface standardization provide for assignment of particular functions for each button on three button mice. If the current trends are eventually adopted by the industry, the functions assigned to mouse buttons will normally be pre-defined and not configurable by the user or developer. Consequently, users will not be able to effectively perform data manipulation operations completely on the mouse, and will be required to revert to the keyboard.

Finally, some other software and hardware vendors have chosen to create modified keyboards that include additional keys specifically designed for the vendor's software. These keys are software specific and are located above or to the left of the standard keyboard. Although effective, the hardware modifications are for specific software and are not flexible enough to function with revised or different software. In addition, users are required to purchase the modified keyboard if they wish to use the additional keys, adding further expense for the user or the vendor. Consequently, optimal user efficiency has not been achievable without breaking from industry established standards.

SUMMARY OF THE PRESENT INVENTION

A computer system according to the present invention improves the user's efficiency by allowing the user to perform pointing device related data manipulation functions without visually searching for particular keys or removing his hand from the pointing device. The computer system includes a keyboard, a pointing device, and a data manipulation device. In the preferred embodiments, the data manipulation device is a stand alone keypad or a keypad attached to the keyboard. In either embodiment, the data manipulation keypad is located on the opposite side of the keyboard from the pointing device. A series of keys on top of a housing are operated by the user with one hand while the other hand operates the pointing device.

Using the data manipulation keypad, the user has single-key access to the most common pointing device related data manipulation functions. For example, when one of the keys is pressed, the data manipulation keypad generates a set of signals identical to the SAA/CUA standard signals generated by the keyboard for a particular data manipulation function. Signals received from the data manipulation keypad are treated like signals from the keyboard, so the computer executes the operation associated with the SAA/CUA sequence on the designated data. Consequently, the user can designate data with one hand on the pointing device and perform manipulation functions with his other hand on the data manipulation keypad without looking away from the display or moving his hands, significantly improving the user's efficiency.

BRIEF DESCRIPTION OF THE DRAWINGS

A better understanding of the present system can be obtained when the description of the preferred embodiment is considered in conjunction with the following drawings, in which.

DETAILED DESCRIPTION OF THE PREFERRED EMBODIMENT

Figure 1:
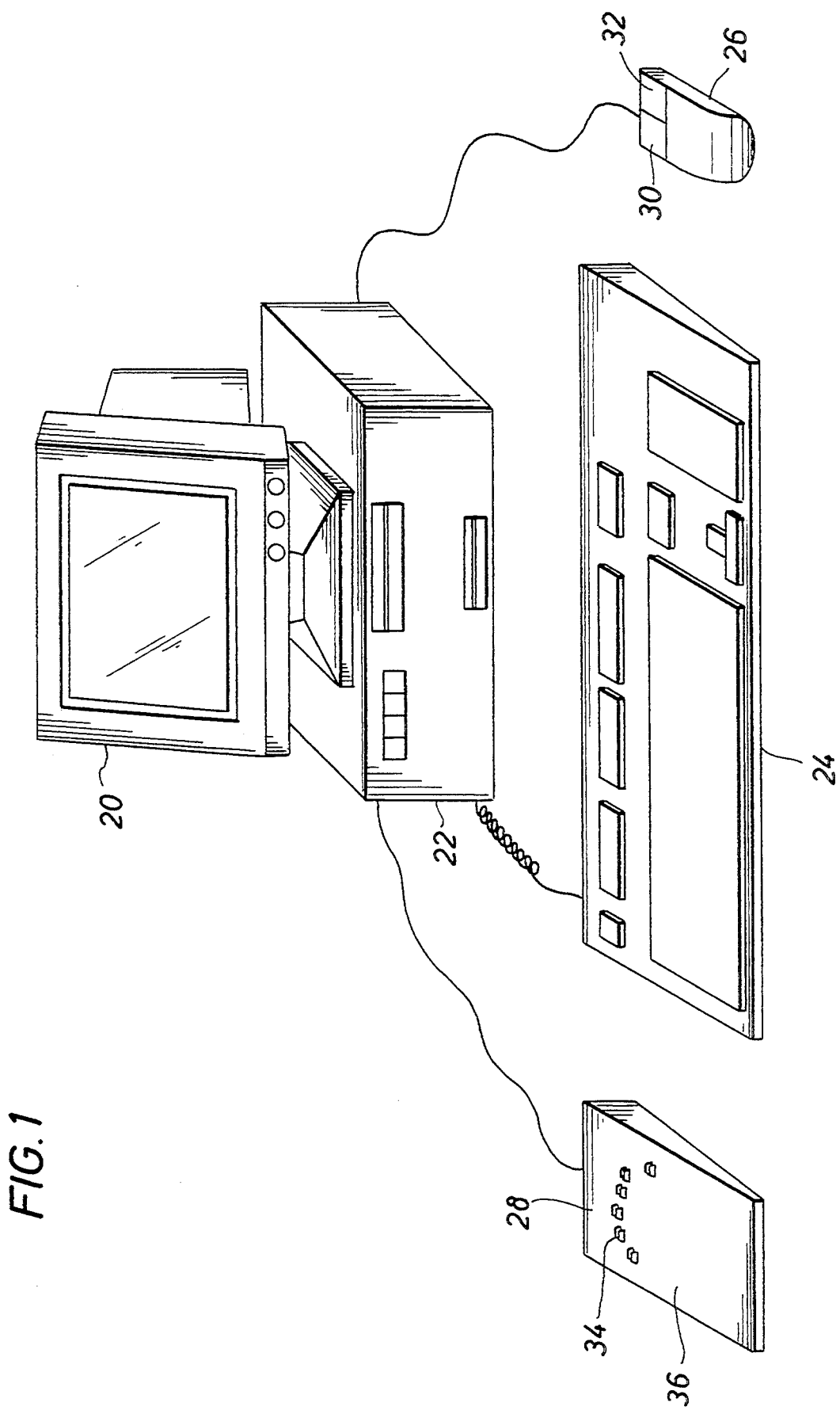
FIG. 1 is a perspective view of a computer system incorporating the present invention and having a stand alone data manipulation device connected to the computer.
Figure 2:
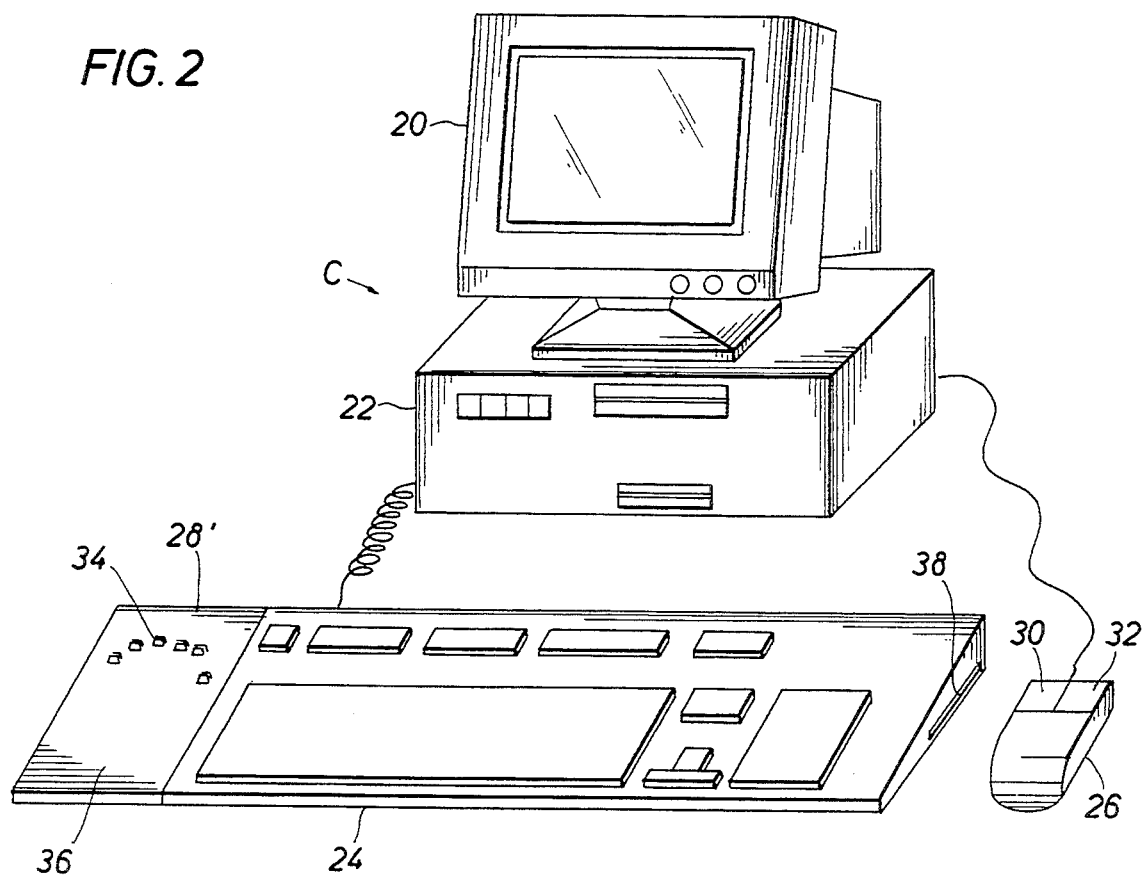
FIG. 2 is a perspective view of a computer system incorporating the present invention and having a keyboard extension data manipulation device connected to the keyboard.

Referring now to FIGS. 1 and 2, a diagram of a computer system C incorporating the present invention is shown. The computer system C is based on a computer 22 and includes a set of user interface devices to allow the user to provide data to and receive information from the computer system C. In particular, the computer system C includes a display 20, which is the primary output interface component from the computer 22 to the user.

For user-to-computer interfacing, a keyboard 24 is connected to the computer 22 to allow the user to enter data and direct the execution of the software. When keys on the keyboard 24 are struck, the keyboard 24 generates a set of signals that indicate which keys have been depressed. If a key has been depressed, the keyboard 24 of a computer 22 compatible with the IBM PC generates a unique "make" code corresponding to the depressed key, and conversely, when the key is released, the keyboard 24 sends a specific "break" code. Therefore, to enter a character or execute a function, the user operates the keyboard 24 to generate unique make and break signals that are received by the computer 22, which then enters the data or initiates the function according to the signal combination received.

As the user enters data into the computer 22, the data is shown on the display 20. A mouse 26 is then used to designate data for manipulation, although any type of electronic pointing device used for designating data in computer systems may be used. To designate particular data for manipulation, the mouse 26 includes two buttons 30, 32 which the user operates to mark particular locations and data blocks on the display 20. Using the mouse 26, the user can indicate which data is targeted for manipulation.

Figure 3:
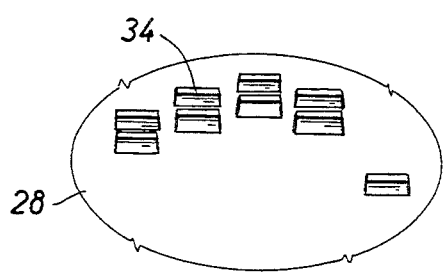
FIG. 3 is a perspective view of a data manipulation device having nine keys.
Figure 4:
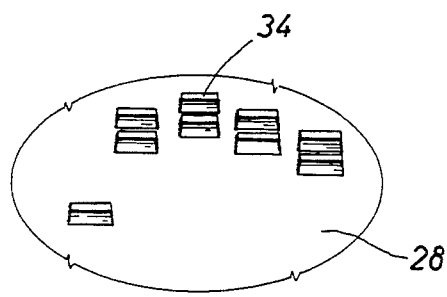
FIG. 4 is a perspective view of a data manipulation device for a user that operates a pointing device with his left hand and the data manipulation device with his right hand.
Figure 5:
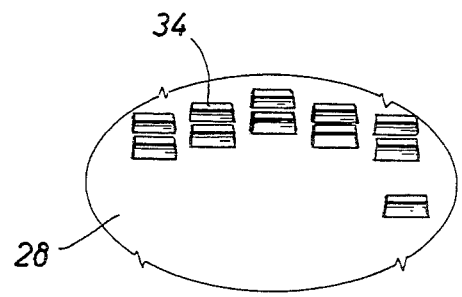
FIG. 5 is a perspective view of a data manipulation device having eleven keys.

Finally, the present system C includes a data manipulation keypad 28, which enables the user to execute data manipulation functions by pressing a single key. The data manipulation keypad 28 is positioned on the opposite side of the keyboard 24 from the mouse 26, so that the user can designate data with one hand, and enter data manipulation functions with the other. The data manipulation keypad 28 includes a set of keys 34 on top of a housing 36. While the user operates the mouse 26 with one hand, the other hand rests on the keypad housing 36 with the fingers placed over the keys 34. To allow the user's hand to rest naturally upon the data manipulation keypad 28, the keys 34 are arranged in a curved pattern. The key locations conform to the finger locations for the hand that is not operating the mouse 26. Keypads designed for either hand, as shown in FIGS. 3 and 4, accommodate left- and right-handed users, and the manufacturer may produce a variety of data manipulation keypad sizes for different hand sizes. Preferably, only one key is positioned under the thumb, and two keys are positioned under each finger. In addition, two extra keys may be positioned near the index finger as shown in FIG. 5 so that the index finger operates a total of four keys.

When functions are executed by the keyboard 24, the series of make codes for the depressed keys comprises a unique set of signals that are provided to indicate a particular function to be performed on the designated data. Similarly, the data manipulation keypad 28 executes data manipulation functions by providing signal sequences that are identical to those of the keyboard 24 for a particular function. Each key 34 provides the user with single-key access to a particular data manipulation function. In some instances, a keypad key 34 replaces a multi-key operation, like the COPY function requiring concurrent activation of the CTRL and INSERT keys on the keyboard 24, while in other instances, the key 34 may be redundant, such as for the standard DELETE function. Unlike the keyboard 24, however, a multi-key series of signals is generated by pressing a single key on the data manipulation keypad 28.

Thus, the data manipulation keypad 28 provides quick and easy access to the operations most frequently used in conjunction with the mouse 26. By designating data with one hand on the mouse 26 and manipulating data with the other hand on the data manipulation keypad 28, visual searching for keys by the user is significantly reduced. Because the most common editing functions may be executed from the data manipulation keypad 28, the user seldom needs to remove his hand from the mouse 26 or look away from the display 20 while manipulating data. It should be particularly noted that the present system C is effective for both text and graphics oriented applications.

In the preferred embodiments, the data manipulation keypad 28 can be either a stand alone unit as shown in FIG. 1, or a detachable extension keypad 28' of the keyboard 24, as shown in FIG. 2. As illustrated in FIG. 1, the stand alone data manipulation keypad 28 plugs into the computer 22 to provide data manipulation signals directly to the computer system C. In the preferred embodiment, the stand-alone data manipulation keypad 28 is controlled by a microprocessor and includes a read-only memory (ROM) to store basic operation and reconfiguration programs. Initially, the keys 34 are preprogrammed by the manufacturer so that common data manipulation functions, like COPY, DELETE, CUT, and PASTE, are already assigned to particular keys. If the initial configuration is unacceptable to the user, if additional, nonpreprogrammed keys are present, or if a specialized software package requires non-standard signals, the data manipulation keypad 28 may be reprogrammed by the user to suit his individual preferences. The key assignments are stored in the computer system's C permanent memory so that the key configuration is preserved and restored to the data manipulation keypad 28 when the system C is power cycled.

When one of the keys 34 is activated, the keypad microprocessor registers which key has been depressed, determines the appropriate signal to deliver from memory, and sends the keyboard equivalent make signals to the computer 22. When the key is released, the data manipulation keypad 28 provides the keyboard equivalent break codes. For example, when the CUT key is depressed on the data manipulation keypad 28, the microprocessor registers which of the keys has been activated. By checking its memory, the microprocessor determines the appropriate SAA/CUA series of signals for the CUT function, which is the make code for the CTRL key followed by the make code for the DELETE key. When the computer 22 receives the signals, the data block designated on the display 20 by clicking and dragging the mouse 26 is cut as if the CUT function were executed from the main menus. As the key on the data manipulation keypad 28 is released, the data manipulation keypad 28 generates the break codes for the DELETE and CTRL keys, and the system C continues operations.

The keyboard extension embodiment of the data manipulation keypad 28' shown in FIG. 2, on the other hand, does not require a separate microprocessor. The data manipulation keypad 28' is detachably plugged into a connector 38 located on either side of the keyboard 24, and the keyboard controller already present in keyboard 24 registers the presence of the data manipulation keypad 28'. If the data manipulation keypad 28' is attached, the keyboard controller monitors not only the keyboard 24 for signals, but the keypad keys 34 as well. Like the stand alone embodiment 28 of FIG. 1, the keyboard extension data manipulation device 28' is initially programmed for default operations including the most common data manipulation functions, but can be reconfigured to suit the user. The computer 22 permanently stores the configuration information, and each time the system C is power cycled, the configuration information is restored to the keyboard memory.

When a key 34 is depressed, the keyboard controller registers the signal, checks its memory for the corresponding keyboard equivalent signal, and provides it to the computer 22. As the key 34 is depressed, the keyboard controller generates the make codes for the SAA/CUA standard signals or other programmed key sequence, and as the key 34 is released, the break codes are delivered, as in the stand alone example above.

In another embodiment, more functions may be added to the data manipulation keypad 28 or 28' by providing for functions executed in conjunction with secondary function keys. These keys do not execute functions by themselves, but instead indicate an alternative operation for a key 34 that is depressed at the same time as the secondary function key. This feature is analogous to the functions performed by conventional keyboard keys in conjunction with the SHIFT key. Consequently, three of the keypad keys 34 may be assigned SHIFT, ALT, and CTRL functions as secondary function keys, and each key other than the SHIFT, ALT, and CTRL keys may be assigned a second, third, and even fourth operation for when the key 34 is depressed at the same time as the SHIFT, ALT, or CTRL key. It should be noted, however, that when executing an operation that requires the CTRL key, like the CTRL and DELETE keys required for a CUT operation, it is not necessary to depress the CTRL key on the data manipulation keypad 28 or 28' before pressing the CUT key. The data manipulation keypad 28 or 28' generates the CTRL and DELETE signals when the CUT key alone is activated. Instead, depressing and holding down the CTRL key before striking the CUT key causes the system C to execute the secondary function assigned to the key 34 in conjunction with the CTRL key.

An example of the use of the data manipulation keypad 28 or 28' is as follows. A given amount of text is present on the display 20. Using the mouse 26, a block of text is marked by moving the cursor to the beginning of the block, clicking a button 30, moving the cursor to the end of the block and again clicking the button 30. With the block now marked, the user simply uses his other hand, which is on the data manipulation keypad 28 or 28', to select the desired function, such as CUT. The data manipulation keypad 28 or 28' provides the CTRL and DELETE make codes to the computer C, and the block is cut. The CUT key is released and CTRL and DELETE break codes are sent. The user then moves the cursor to the desired insertion point using the mouse 26 and clicks the button 30, placing the cursor. The user then simply selects the INSERT key on the data manipulation keypad 28 or 28'. The SHIFT and INSERT make codes are provided to the computer C and the block is inserted at the cursor location. The INSERT key is released and the SHIFT and INSERT break codes are provided by the data manipulation keypad 28 or 28'.

Thus the user has marked and moved a block of text without shifting his hands, hunting the keyboard or using extra mouse movements. He simply blocks, and request the operation, using both hands.

By providing the SHIFT, CTRL and ALT keys as secondary keys on the data manipulation keypad 28 or 28' other mouse selection functions, such as selecting multiple individual items, can be performed without hand movement, on or to the keyboard. This further improves the user's efficiency with the present system as even more mouse-related commands and functions can be performed without hand movements.

Throughout the above disclosure, pointing functions have been described as being performed by the mouse 26. It should be noted, however, that the pointing device of present system is not limited to the mouse of the preferred embodiment, and is operable using a wide array pointing devices. Any electronic pointing device capable of designating text or locations on the display 20 may be used in or adapted to the present system.

The above disclosure and description are illustrative and explanatory thereof, and various changes in size, shape, materials, components, circuit elements, wiring connections and contacts, as well as in the details of the illustrated circuitry and construction, may be made without departing from the spirit of the invention.

I claim:

1. A computer system operated by a user's hands, comprising
   a computer for receiving data and commands,
   a monitor having a display electrically coupled to said computer;
   a pointing device sized to conform to and operated by one of the user's hands, said pointing device electrically coupled to said computer for designating on said display data to be manipulated,
   a keyboard coupled to said computer for entering keyboard sequences representing data and commands, and
   a keypad operated by the other of the user's hands having a housing, said keypad including respective pairs of predefined multiple key sequence keys dedicated to each of the user's four fingers and a predefined multiple key sequence key dedicated to the user's thumb, said keypad being electrically coupled to said computer to provide a predefined multiple key sequence upon depression of any one of said predefined multiple key sequence keys..- whereby said keys are sized and are positioned on said keypad so that the user uses said other hand to operate the keypad to perform manipulations on the data designated by said pointing device without being required to look away from said display.

2. The system of claim 1 wherein said keys on said keypad may be arranged for a right-handed user or a left-handed user.

3. The system of claim 1 wherein said keys are positioned in an arc so as to be accessible to each of the user's fingers.

4. The system of claim 1 wherein said keypad includes a microprocessor and a read only memory wherein each predefined multiple key sequence key is controlled by said microprocessor and said read-only memory stores reconfiguration programs.

5. The system of claim 4 wherein said computer includes a permanent memory, wherein each predefined multiple key sequence key is configurable, and wherein said key configuration is preserved in said computer permanent memory and restored to the keypad when the system is power cycled.

6. The system of claim 1, said keyboard coupled to said computer for entering keyboard sequences representing data and commands having CONTROL and DELETE keys and said keypad having a CUT function key, wherein a predefined multiple key sequence associated with said CUT function key on said keypad is equivalent to the sequence created by the depression of the CONTROL and DELETE keys of the keyboard.

7. The system of claim 1, said keyboard coupled to said computer for entering keyboard sequences representing data and commands having SHIFT and INSERT keys and said keypad having an INSERT function key, wherein a predefined multiple key sequence associated with said INSERT function key on said keypad is equivalent to the sequence created by the depression of the SHIFT and INSERT keys of the keyboard.

8. The system of claim 1, said keyboard coupled to said computer for entering keyboard sequences representing data and commands having CONTROL and INSERT keys and said keypad having a COPY function key, wherein a predefined multiple key sequence associated with said COPY function key on said keypad is equivalent to the sequence created by the depression of the CONTROL and INSERT keys of the keyboard.

9. The system of claim 1, said keyboard coupled to said computer for entering keyboard sequences representing data and commands having SHIFT, ALT and CONTROL function keys, and said keypad having single sequence keys.

10. The system of claim 9 wherein when one of said single sequence keys on said keypad is actuated with one of said predefined multiple key sequence keys on said keypad, a second predefined multiple key sequence indicative of a second data manipulation operation is provided.

11. System of claim 1 wherein said keypad is electrically coupled to said keyboard and said keyboard is electrically coupled to said computer.

12. A computer system operated by a user's hands, comprising:
   a computer for receiving data and commands,
   a monitor having a display electrically coupled to said computer,
   a pointing device sized to conform to and operated by one of the user's hands, said pointing device electrically coupled to said computer for designating on said display data to be manipulated,
   a keyboard coupled to said computer for entering keyboard sequences representing data and commands, and
   a keypad electrically coupled to said computer and having five predefined multiple key sequence keys, each of said keys dedicated to a different one of the user's five fingers on the user's other hand, said keypad providing a predefined multiple key sequence upon depression of any one of said predefined multiple key sequence keys, each individual predefined multiple key sequence key being sized and positioned on said keypad so that the user uses said other hand to operate the keypad to perform manipulations on the data designated by said pointing device without being required to look away from said display.

13. A keypad for use with a computer system operated by a user's hands, the computer system including a computer having a display and a keyboard electrically coupled to said computer for entering keyboard sequences representing data and commands and a pointing device sized to conform to and operated by one of the user's hands and electrically coupled to said computer for designating on said display data to be manipulated, said keypad comprising:

a housing having a keypad including respective pairs of predefined multiple key sequence keys dedicated to three of the user's five fingers on said user's other hand and four other predefined multiple key sequence keys on said keypad dedicated to one of said user's two remaining fingers on said user's other hand, said keypad being electrically coupled to said computer to provide a predefined multiple key sequence upon depression of any one of said predefined multiple key sequence keys whereby said keys are sized and are positioned on said keypad so that the user uses said other hand to operate the keypad to perform manipulations on the data designated by said pointing device without being required to look away from said display.

14. The keypad of claim 13 wherein said keys are positioned in an arc so as to be accessible to each of the user's fingers.

15. The keypad of claim 13 wherein said keypad includes a microprocessor and a read only memory wherein each keypad key is controlled by said microprocessor in the keypad housing.

16. The keypad of claim 13 wherein the keyboard electrically coupled to said computer for entering keyboard sequence representing data and commands has CONTROL and DELETE keys and wherein said keypad has a CUT function key, wherein said predefined multiple key sequence associated with said CUT function key on said keypad is equivalent to the sequence created by the depression of the CONTROL and DELETE sequence keys of the keyboard.

17. The keypad of claim 13 wherein the keyboard electrically coupled to said computer for entering keyboard sequences representing data and commands has SHIFT and INSERT keys and wherein said keypad has an INSERT function key, wherein said predefined multiple key sequence associated with said INSERT function key on said keypad is equivalent to the sequence created by the depression of the SHIFT and INSERT sequence keys of the keyboard.

18. The keypad of claim 13 wherein the keyboard electrically coupled to said computer for entering keyboard sequences representing data and commands has CONTROL and INSERT keys and wherein said keypad has a COPY function key, wherein said predefined multiple key sequence associated with said COPY function key on said keypad is equivalent to the sequence created by the depression of the CONTROL and INSERT sequence keys of the keyboard.

19. The keypad of claim 13 wherein the keyboard electrically coupled to said computer for entering keyboard sequences representing data and commands has SHIFT, ALT and CONTROL function keys and wherein said keypad has single sequence keys.

20. The keypad of claim 19 wherein when one of said single sequence keys on said keypad is actuated with one of said predefined multiple key sequence keys on said keypad, a second predefined multiple keypad sequence indicative of a second data manipulation operation is provided.

21. A computer system operated by a user's hands, comprising a computer for receiving data and commands,
   a monitor having a display electrically coupled to said computer;
   a pointing device sized to conform to and operated by one of the user's hands, said pointing device electrically coupled to said computer for designating on said display data to be manipulated,
   a keyboard coupled to said computer for entering keyboard sequences representing data and commands, and
   a keypad operated by the other of the user's hands having a housing, said keypad including a different predefined multiple key sequence key for each of the user's five fingers on the user's other hand, said keypad being electrically coupled to said computer to provide a predefined multiple key sequence upon depression of any one of said predefined multiple key sequence keys whereby said keys are sized and are positioned on said keypad so that the user uses said other hand to operate the keypad to perform manipulations on the data designated by said pointing device without being required to look away from said display.

* * * * *

UNITED STATES PATENT AND TRADEMARK OFFICE
CERTIFICATE OF CORRECTION

PATENT NO. : 5,414,422

DATED : May 9, 1995

INVENTOR(S) : Donald M. Allen

It is certified that error appears in the above-identified patent and that said Letters Patent is hereby corrected as shown below:

In col. 7, line 57, please delete "..-".

Signed and Sealed this

Fourteenth Day of November, 1995

*Attest:*

BRUCE LEHMAN

*Attesting Officer*  Commissioner of Patents and Trademarks